United States Patent
Curewitz et al.

(10) Patent No.: US 10,003,675 B2
(45) Date of Patent: Jun. 19, 2018

(54) PACKET PROCESSOR RECEIVING PACKETS CONTAINING INSTRUCTIONS, DATA, AND STARTING LOCATION AND GENERATING PACKETS CONTAINING INSTRUCTIONS AND DATA

(71) Applicant: Micron Technology, Inc., Boise, ID (US)

(72) Inventors: Kenneth M Curewitz, Cameron Park, CA (US); Sean Eilert, Penryn, CA (US); Ameen D. Akel, Rancho Cordova, CA (US); Hongyu Wang, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 809 days.

(21) Appl. No.: 14/094,273

(22) Filed: Dec. 2, 2013

(65) Prior Publication Data
US 2015/0153963 A1    Jun. 4, 2015

(51) Int. Cl.
G06F 9/38     (2006.01)
H04L 29/06    (2006.01)
G06F 3/06     (2006.01)

(52) U.S. Cl.
CPC .............. *H04L 69/22* (2013.01); *G06F 3/061* (2013.01); *G06F 3/0659* (2013.01); *G06F 3/0679* (2013.01); *G06F 3/0688* (2013.01); *G06F 9/3885* (2013.01); *G06F 2003/0697* (2013.01)

(58) Field of Classification Search
CPC ....... G06F 9/3885; G06F 9/3889; H04L 69/22
See application file for complete search history.

(56) References Cited

U.S. PATENT DOCUMENTS

| | | | |
|---|---|---|---|
| 5,105,425 A | | 4/1992 | Brewer |
| 5,134,711 A | | 7/1992 | Asthana et al. |
| 5,590,370 A | | 12/1996 | Asthana et al. |
| 5,671,430 A | * | 9/1997 | Gunzinger .............. G06F 15/17 709/201 |
| 5,754,948 A | | 5/1998 | Metze |
| 6,101,620 A | | 8/2000 | Ranganathan |
| 6,105,130 A | | 8/2000 | Wu et al. |

(Continued)

FOREIGN PATENT DOCUMENTS

| CN | 1322355 A | 11/2001 |
|---|---|---|
| CN | 1496511 A | 5/2004 |

(Continued)

OTHER PUBLICATIONS

"Apparatus and Methods for a Distributed Memory System Including Memory Nodes", U.S. Appl. No. 13/842,984, filed Mar. 15, 2013, 28 pgs.

(Continued)

*Primary Examiner* — Jacob A Petranek
(74) *Attorney, Agent, or Firm* — Schwegman Lundberg & Woessner, P.A.

(57) ABSTRACT

A method, an apparatus, and a system have been disclosed. An embodiment of the method includes an autonomous memory device receiving a set of instructions, the memory device executing the set of instructions, combining the set of instructions with any data recovered from the memory device in response to the set of instructions into a packet, and transmitting the packet from the memory device.

29 Claims, 11 Drawing Sheets

(56) References Cited

U.S. PATENT DOCUMENTS

| | | |
|---|---|---|
| 6,131,139 A | 10/2000 | Kikuchi et al. |
| 7,050,351 B2 | 5/2006 | Halbert et al. |
| 7,242,216 B1 | 7/2007 | Schmit et al. |
| 7,581,080 B2 | 8/2009 | Beaumont |
| 7,623,365 B2 | 11/2009 | Jeddeloh |
| 7,634,622 B1 * | 12/2009 | Musoll .................. G06F 9/3851 370/375 |
| 7,913,033 B2 | 3/2011 | Roohparvar |
| 8,259,506 B1 | 9/2012 | Sommer et al. |
| 8,427,952 B1 * | 4/2013 | Pearce ................ G06F 9/30145 370/235 |
| 8,775,685 B1 * | 7/2014 | Brebner .................. H04L 47/00 370/392 |
| 9,015,440 B2 | 4/2015 | Eilert et al. |
| 9,612,750 B2 | 4/2017 | Eilert et al. |
| 9,779,057 B2 | 10/2017 | Eilert |
| 9,779,138 B2 | 10/2017 | Curewitz |
| 2001/0049744 A1 * | 12/2001 | Hussey ............... G06F 9/30043 709/238 |
| 2002/0009119 A1 | 1/2002 | Matthew et al. |
| 2002/0108017 A1 | 8/2002 | Kenchammana-Hoskote et al. |
| 2002/0124137 A1 | 9/2002 | Ulrich et al. |
| 2002/0147724 A1 | 10/2002 | Fries et al. |
| 2002/0161848 A1 | 10/2002 | Willman et al. |
| 2003/0013232 A1 | 1/2003 | Towle et al. |
| 2004/0117603 A1 | 6/2004 | Arimilli et al. |
| 2004/0186832 A1 | 9/2004 | Jardin |
| 2006/0015652 A1 | 1/2006 | Day et al. |
| 2006/0250965 A1 | 11/2006 | Irwin |
| 2007/0005922 A1 | 1/2007 | Swaminathan et al. |
| 2007/0088703 A1 | 4/2007 | Kasiolas et al. |
| 2007/0136508 A1 | 6/2007 | Rieke et al. |
| 2007/0204116 A1 | 8/2007 | Wallner et al. |
| 2007/0233710 A1 | 10/2007 | Passey et al. |
| 2007/0288587 A1 | 12/2007 | Aguilera et al. |
| 2008/0005116 A1 | 1/2008 | Uno |
| 2008/0043716 A1 | 2/2008 | Toombs et al. |
| 2008/0054489 A1 | 3/2008 | Farrar et al. |
| 2008/0065644 A1 | 3/2008 | Pasupuleti et al. |
| 2008/0077736 A1 | 3/2008 | Mukherjee et al. |
| 2008/0109424 A1 | 5/2008 | Day et al. |
| 2008/0162835 A1 | 7/2008 | Wilson et al. |
| 2008/0297196 A1 | 12/2008 | Kelem et al. |
| 2009/0006798 A1 | 1/2009 | Bartley et al. |
| 2009/0064336 A1 | 3/2009 | Garbow et al. |
| 2009/0164678 A1 * | 6/2009 | Hu .......................... G06F 13/42 710/106 |
| 2009/0319550 A1 | 12/2009 | Shau et al. |
| 2010/0106890 A1 | 4/2010 | Lasser et al. |
| 2010/0161914 A1 | 6/2010 | Eilert et al. |
| 2010/0165991 A1 * | 7/2010 | Veal ....................... G06F 9/3885 370/392 |
| 2010/0180182 A1 | 7/2010 | Trantham |
| 2010/0211721 A1 | 8/2010 | Resnick |
| 2010/0284287 A1 | 11/2010 | Venuto |
| 2011/0040771 A1 | 2/2011 | Gilyadov et al. |
| 2011/0066796 A1 | 3/2011 | Eilert et al. |
| 2011/0067039 A1 | 3/2011 | Eilert et al. |
| 2011/0093669 A1 | 4/2011 | Davis et al. |
| 2011/0185105 A1 | 7/2011 | Yano et al. |
| 2011/0271158 A1 | 11/2011 | Jeddeloh |
| 2012/0011127 A1 | 1/2012 | Kim |
| 2012/0047126 A1 | 2/2012 | Branscome et al. |
| 2012/0054452 A1 | 3/2012 | Kumar et al. |
| 2012/0102275 A1 * | 4/2012 | Resnick ............... G11C 7/1006 711/154 |
| 2012/0117354 A1 | 5/2012 | Tatsumura et al. |
| 2012/0203761 A1 | 8/2012 | Biran et al. |
| 2012/0203986 A1 | 8/2012 | Strasser et al. |
| 2013/0054727 A1 | 2/2013 | Kumano et al. |
| 2013/0173655 A1 | 7/2013 | Hoots, III, III et al. |
| 2014/0136764 A1 | 5/2014 | Li et al. |
| 2014/0143501 A1 | 5/2014 | Creamer et al. |
| 2014/0281278 A1 | 9/2014 | Curewitz et al. |
| 2015/0052114 A1 | 2/2015 | Curewitz et al. |
| 2015/0205530 A1 | 7/2015 | Eilert et al. |
| 2017/0351737 A1 | 12/2017 | Curewitz et al. |

FOREIGN PATENT DOCUMENTS

| | | |
|---|---|---|
| CN | 102025766 A | 4/2011 |
| CN | 102025766 B | 2/2016 |
| CN | 102014011 B | 5/2016 |
| DE | 102010044529 A1 | 3/2011 |
| DE | 102010044531 A1 | 4/2011 |
| EP | 0482741 A2 | 4/1992 |
| GB | 2220509 A | 10/1990 |
| JP | 1132356 A | 2/1992 |
| JP | 04273575 | 9/1992 |
| JP | 052610 A | 1/1993 |
| JP | 06139200 A | 5/1994 |
| JP | 06208501 A | 7/1994 |
| JP | 07319923 A | 12/1995 |
| JP | 08501403 A | 2/1996 |
| JP | 09204355 A | 8/1997 |
| JP | 11232180 A | 8/1999 |
| JP | 2007193811 A | 8/2007 |
| JP | 2007529833 A | 10/2007 |
| JP | 2011060278 A | 3/2011 |
| JP | 2011060279 A | 3/2011 |
| JP | 2012103926 A | 5/2012 |
| JP | 2012159903 A | 8/2012 |
| KR | 20060132856 A | 12/2006 |
| KR | 1020130000083 A | 1/2013 |
| KR | 20130073991 A | 7/2013 |
| KR | 10-1747966 | 6/2017 |
| TW | 201518968 A | 5/2015 |
| WO | WO-2009051716 A2 | 4/2009 |
| WO | WO-2012054159 A1 | 4/2012 |
| WO | WO-2015023625 A1 | 2/2015 |
| WO | WO-2015084728 A1 | 6/2015 |

OTHER PUBLICATIONS

"U.S. Appl. No. 13/965,739, Advisory Action mailed Mar. 11, 2016", 4 pgs.

"U.S. Appl. No. 13/965,739, Amendment filed Mar. 17, 2016", 13 pgs.

"U.S. Appl. No. 13/965,739, Final Office Action mailed Dec. 18, 2015", 30 pgs.

"U.S. Appl. No. 13/965,739, Non Final Office Action mailed Aug. 27, 2015", 27 pgs.

"U.S. Appl. No. 13/965,739, Response filed Feb. 17, 2016 to Final Office Action mailed Dec. 18, 2015", 13 pgs.

"U.S. Appl. No. 13/965,739, Response filed Nov. 24, 2015 to", 13 pgs.

"International Application Serial No. PCT/US2014/050624, International Preliminary Report on Patentability mailed Feb. 25, 2016", 7 pgs.

"International Application Serial No. PCT/US2014/050624, International Search Report mailed Nov. 28, 2014", 3 pgs.

"International Application Serial No. PCT/US2014/050624, Written Opinion mailed Nov. 28, 2014", 5 pgs.

"International Application Serial No. PCT/US2014/067927, International Search Report mailed Mar. 25, 2015", 6 pgs.

"International Application Serial No. PCT/US2014/067927, Written Opinon mailed Mar. 25, 2015", 7 pgs.

"U.S. Appl. No. 12/557,776, Appeal Brief filed Oct. 27, 2014", 22 pgs.

"U.S. Appl. No. 12/557,776, Appeal Decision dated Sep. 28, 2016", 17 pgs.

"U.S. Appl. No. 12/557,776, Decision on Pre-Appeal Brief Request dated Dec. 5, 2013", 2 pgs.

"U.S. Appl. No. 12/557,776, Final Office Action dated Jul. 11, 2014", 17 pgs.

"U.S. Appl. No. 12/557,776, Final Office Action dated Jul. 15, 2013", 21 pgs.

"U.S. Appl. No. 12/557,776, Final Office Action dated Aug. 9, 2012", 20 pgs.

(56) References Cited

OTHER PUBLICATIONS

"U.S. Appl. No. 12/557,776, Non Final Office Action dated Feb. 2, 2017", 19 pgs.
"U.S. Appl. No. 12/557,776, Non Final Office Action dated Feb. 6, 2014", 17 pgs.
"U.S. Appl. No. 12/557,776, Non Final Office Action dated Feb. 14, 2013", 20 pgs.
"U.S. Appl. No. 12/557,776, Non Final Office Action dated Mar. 8, 2012", 16 pgs.
"U.S. Appl. No. 12/557,776, Pre-Appeal Brief Request filed Nov. 14, 2013", 5 pgs.
"U.S. Appl. No. 12/557,776, Response filed May 6, 2014 to Non Final Office Action dated Feb. 6, 2014", 12 pgs.
"U.S. Appl. No. 12/557,776, Response filed May 14, 2013 to Non Final Office Action dated Feb. 14, 2013", 13 pgs.
"U.S. Appl. No. 12/557,776, Response filed Jun. 8, 2012 to Non Final Office Action dated Mar. 8, 2012", 12 pgs.
"U.S. Appl. No. 12/557,776, Response filed Nov. 9, 2012 to Final Office Action dated Aug. 9, 2012", 13 pgs.
"U.S. Appl. No. 12/557,856, Final Office Action dated Feb. 11, 2014", 16 pgs.
"U.S. Appl. No. 12/557,856, Final Office Action dated Jul. 20, 2012", 15 pgs.
"U.S. Appl. No. 12/557,856, Non Final Office Action dated Jul. 18, 2013", 16 pgs.
"U.S. Appl. No. 12/557,856, Non Final Office Action dated Sep. 9, 2014", 14 pgs.
"U.S. Appl. No. 12/557,856, Non Final Office Action Dec. 9, 2011", 13 pgs.
"U.S. Appl. No. 12/557,856, Notice of Allowance dated Dec. 23, 2014", 7 pgs.
"U.S. Appl. No. 12/557,856, Response filed Mar. 9, 2012 to Non Final Office Action dated Dec. 9, 2011", 9 pgs.
"U.S. Appl. No. 12/557,856, Response filed Jul. 11, 2014 to Final Office Action dated Dec. 11, 2014", 12 pgs.
"U.S. Appl. No. 12/557,856, Response filed Oct. 18, 2013 to Non Final Office Action dated Jul. 18, 2013", 12 pgs.
"U.S. Appl. No. 12/557,856, Response filed Dec. 9, 2014 to Non Final Office Action dated Sep. 9, 2014", 7 pgs.
"U.S. Appl. No. 12/557,856, Response filed Dec. 20, 2012 to Final Office Action dated Jul. 20, 2012", 8 pgs.
"U.S. Appl. No. 13/965,739, Non Final Office Action dated Nov. 4, 2016", 23 pgs.
"U.S. Appl. No. 14/675,172, Advisory Action dated Dec. 14, 2015", 3 pgs.
"U.S. Appl. No. 14/675,172, Final Office Action dated Aug. 26, 2016", 15 pgs.
"U.S. Appl. No. 14/675,172, Final Office Action dated Aug. 27, 2015", 16 pgs.
"U.S. Appl. No. 14/675,172, Non Final Office Action dated Feb. 11, 2016", 17 pgs.
"U.S. Appl. No. 14/675,172, Non Final Office Action dated Apr. 27, 2015", 16 pgs.
"U.S. Appl. No. 14/675,172, Notice of Allowance dated Nov. 23, 2016", 7 pgs.
"U.S. Appl. No. 14/675,172, Response filed May, 11, 2016 to Non Final Office Action dated Feb. 11, 2016", 11 pgs.
"U.S. Appl. No. 14/675,172, Response filed Jul. 27, 2015 to Non Final Office Action dated Apr. 27, 2015", 10 pgs.
"U.S. Appl. No. 14/675,172, Response filed Oct. 26, 2016 to Final Office Action dated Aug. 26, 2016", 10 pgs.
"U.S. Appl. No. 14/675,172, Response flied Nov. 25, 2015 to Final Office Action dated Aug. 27, 2015", 12 pgs.
"U.S. Appl. No. 14/675,172, Response filed Dec. 18, 2015 to Advisory Action dated Dec. 14, 2015", 11 pgs.
"Chinese Application Serial No. 201010225267.2, Office Action dated Feb. 26, 2014", w/English Translation, 26 pgs.
"Chinese Application Serial No. 201010225267.2, Office Action dated May 11, 2015", w/English Translation, 20 pgs.
"Chinese Application Serial No. 201010225267.2, Office Action dated Nov. 15, 2014", w/English Translation, 32 pgs.
"Chinese Application Serial No. 201010226463.1, Office Action dated Jan. 24, 2013", w/English Translation, 21 pgs.
"Chinese Application Serial No. 201010226463.1, Office Action dated Jun. 16, 2015", w/English Claims, 19 pgs.
"Chinese Application Serial No. 201010226463.1, Office Action dated Nov. 27, 2014", w/English Translation, 24 pgs.
"European Application Serial No. 14836383.1, Extended European Search Report dated Mar. 2, 2017", 10 pgs.
"German Application Serial No. 10 2010 044 529.0-53, Office Action dated Aug. 19, 2011", w/English Translation, 7 pgs.
"German Application Serial No. 10 2010 044 531.2-53, Office Action dated Sep. 8, 2011", w/English Translation, 15 pgs.
"Japanese Application Serial No. 2010-183449, Notice of Reasons for Refusal dated Apr. 13, 2015", w/English Translation, 3 pgs.
"Japanese Application Serial No. 2010-183449, Office Action dated Aug. 25, 2014", w/English Translation, 10 pgs.
"Japanese Application Serial No. 2010-183450, Office Action dated Mar. 24, 2014", w/English Translation, 8 pgs.
"Korean Application Serial No. 10-2010-0068824, Office Action dated Apr. 11, 2016", w/English Translation, 8 pgs.
"Korean Application Serial No. 10-2016-7017509, Office Action dated Dec. 21, 2016", W/English Translation, 14 pgs.
"Korean Application Serial No. 2010-0066779, Office Action dated Jan. 21, 2016", w/English Translation, 13 pgs.
"Korean Application Serial No. 2010-0066779, Office Action dated Jul. 27, 2016", w/English Translation, 18 pgs.
"Korean Application Serial No. 2010-0066779, Response filed Mar. 21, 2016 to Office Action dated Jan. 21, 2016", w/English Translation, 23 pgs.
Noumsi, Auguste, et al., "Acceleration of a Content-Based Image-Retrieval Application on the RDISK Cluster", IEEE Parallel and Distributed Processing, (2006), 10 pgs.
Rahm, Erhard, "A Framework for Workload Allocation in Distributed Transaction Processing Systems", Journal of Systems and Software, vol. 18 (2) S, (1992), 171-190.
Stoumpos, Vassilis, et al., "Fragment and Replicate Algoriths for Non-Equi-Join evaluation of Smart Disks", ISADS, (Mar. 2009), 471-478.
"Application Serial No. 13/557,776, Notice of Allowance dated Jul. 19, 2017", 12 pgs.
"Application Serial No. 13/965,739, Notice of Allowance dated Jun. 5, 2017", 9 pgs.
"Japanese Application Serial No. 2016-535174, Office Action dated May 30, 2017", w/English Translation, 10 pgs.
"Application Serial No. 12/557,776, Applicants Reply Brief dated Mar. 16, 2015 in response to Examiners Answer dated Jan. 15, 2015", 7 pgs.
"Application Serial No. 12/557,776, Examiners Answer to Appeal Brief dated Jan. 15, 2015", Jan. 15, 2015.
"Application Serial No. 12/557,776, Response filed May 2, 2017 to Non Final Office Action dated Feb. 2, 2017", 13 pgs.
"Application Serial No. 13/965,739, Response filed Apr. 28, 2017 Non Final Office Action dated Nov. 4, 2016", 18 pgs.
"Chinese Application Serial No. 201010225267.2, Response filed Jul. 27, 2015 to Office Action dated May 11, 2017", w/English Translation, 19 pgs.
"Japanese Application Serial No. 2016-535174, Voluntary Amendment dated Jun. 30, 2016", w/English Translation, 3 pgs.
"Korean Application No. 10-2016-7006563, Notice of Preliminary Rejection dated Aug. 31, 2017", W/ English Translation, 8 pgs.
"Japanese Application Serial No. 2016-535174, Examiners Decision of Final Refusal dated Dec. 5, 2017", w/English Machine Translation, 4 pgs.

* cited by examiner

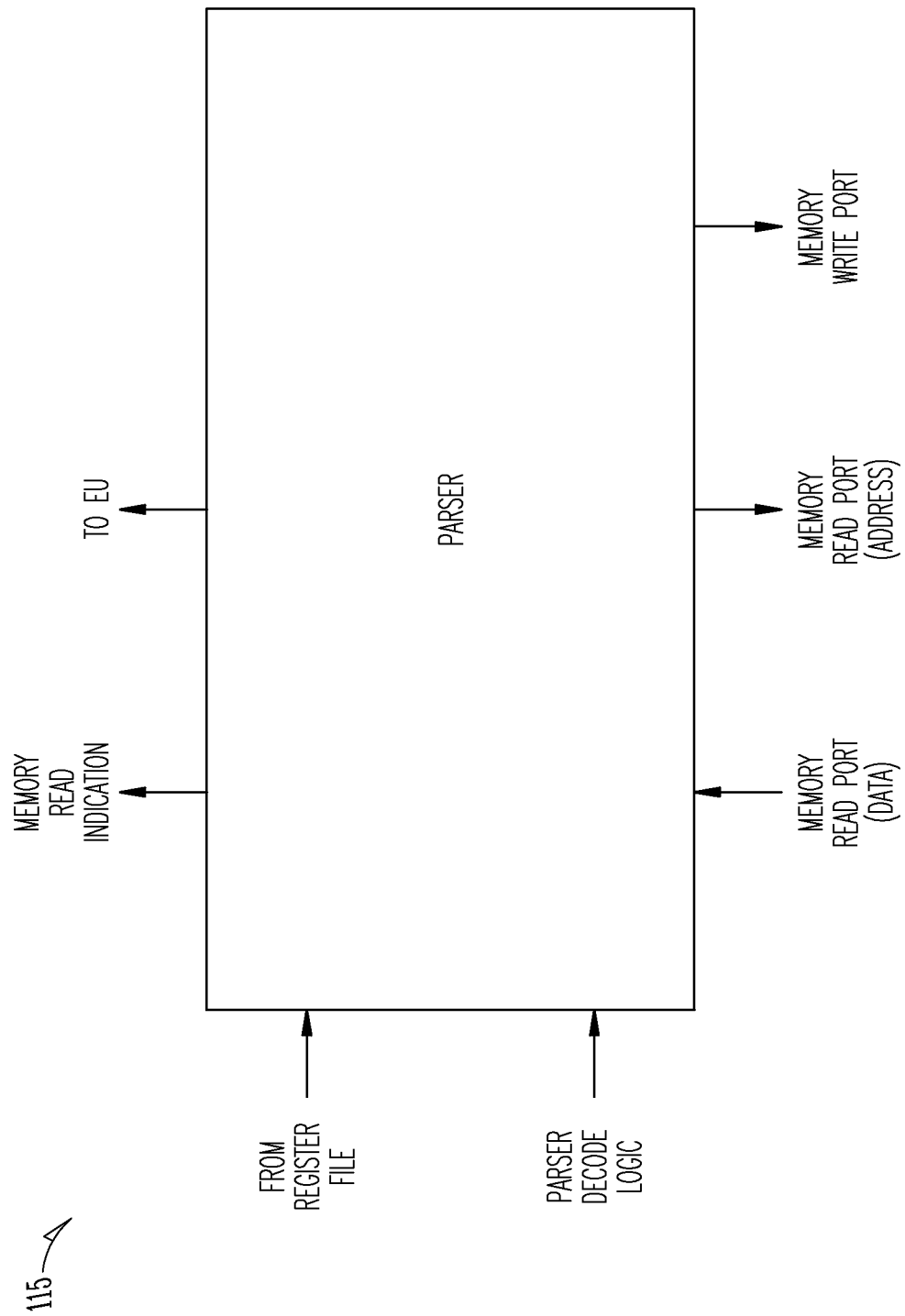

| 1000 | 1001 | 1002 | 1003 |
|---|---|---|---|
| INSTRUCTION D (DESTINATION: $R_d$) | INSTRUCTION C (COMPARISON: $V_c$) | INSTRUCTION T (VALUE IF TRUE: $V_t$) | INSTRUCTION F (VALUE IF FALSE: $V_f$) |

US 10,003,675 B2

PACKET PROCESSOR RECEIVING PACKETS CONTAINING INSTRUCTIONS, DATA, AND STARTING LOCATION AND GENERATING PACKETS CONTAINING INSTRUCTIONS AND DATA

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and non-volatile (e.g., flash) memory.

A number of non-volatile memory devices can be combined to make a solid state drive (SSD) that can emulate a mechanically-operated hard disk drive in a computer system. Solid state drives can provide faster access with greater reliability than mechanical hard drives due to the lack of moving parts.

Due at least in part to the increasing performance of computer systems, memory and solid state drive manufacturers can be under constant pressure to increase the performance of their memory in order to try to keep pace with computer system performance increases. There are general needs to make reading and writing to memory more efficient to relieve any operations burden on computer systems.

BRIEF DESCRIPTION OF THE DRAWINGS

FIG. 8 illustrates a block diagram of an embodiment of a parser in accordance with the embodiment of FIG. 1.

DETAILED DESCRIPTION

Figure 1:
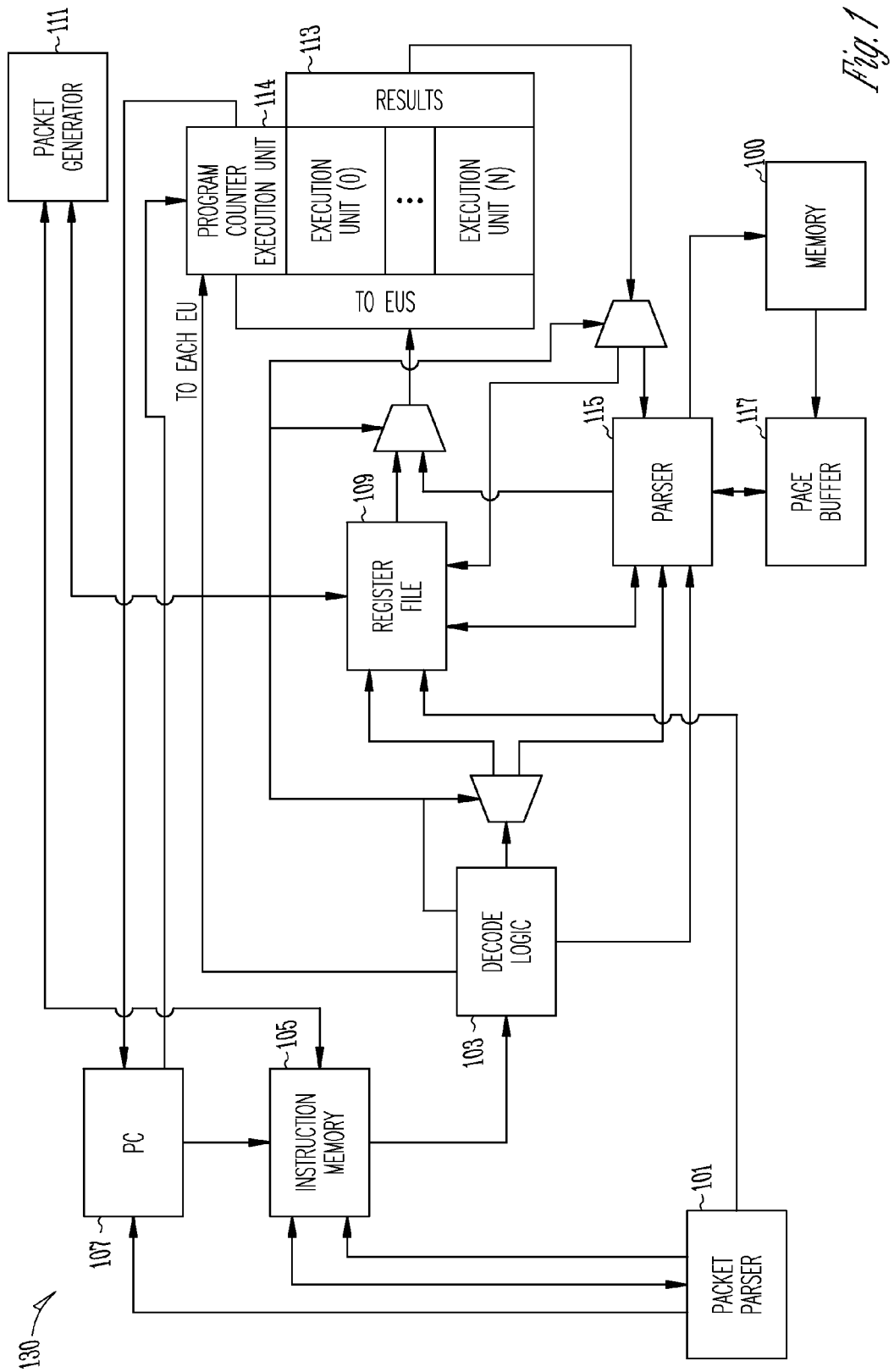
FIG. 1 illustrates a functional block diagram of an embodiment of an autonomous memory processing apparatus.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

The present disclosure is not limited to any one type of memory. The autonomous memory processing apparatus can be associated with any type of memory device, group of memory devices, or memory technology including semiconductor memory, optical memory, or magnetic memory. For example, the memory might include non-volatile (e.g., NAND Flash, NOR Flash, phase change memory (PCM)) or volatile (e.g., DRAM, SRAM).

As used herein, a node can include a packet parser for parsing received packets, a packet generator for generating packets to be transmitted from the node to a network, and a network port that can interface the node with any network. The node can additionally include a processing element for controlling operation of the node as well as memory for storing data. In other embodiments, the node can include additional hardware and/or software/firmware for additional functions. An autonomous memory device having the autonomous processing apparatus can be considered a node.

FIG. 1 illustrates a functional block diagram of an embodiment of an autonomous memory processing apparatus. Such an apparatus can be associated with memory 100 and can be used to relieve a memory bandwidth bottleneck in central processing unit (CPU)-based computing systems. The autonomous memory processing apparatus can be located in an autonomous memory device.

The autonomous memory processing apparatus can include a packet parser 101, a program counter 107, instruction memory 105, decode logic 103, a register file 109, a parser 115, a packet generator 111, one or more execution units (EUs) 113, and a page buffer 117. The elements and the architecture of FIG. 1 are for purposes of illustration only as other embodiments can use other elements and other architectures.

Figure 2:
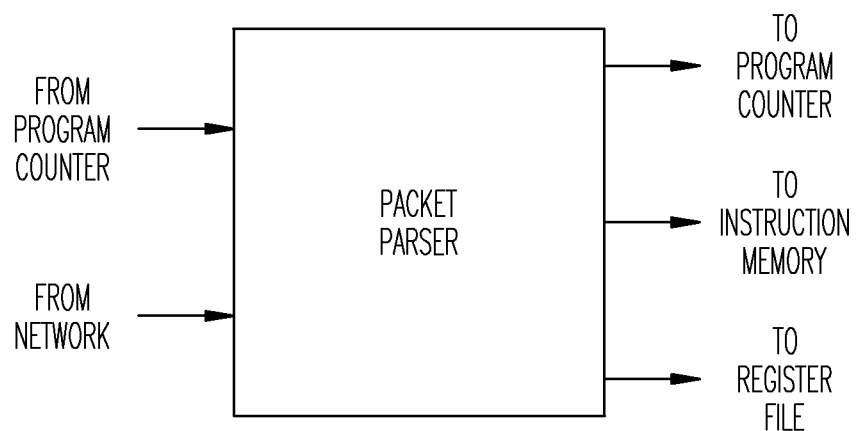
FIG. 2 illustrates a block diagram of an embodiment of a packet parser in accordance with the embodiment of FIG. 1.

FIG. 2 illustrates a block diagram of the packet parser 101. The packet parser 101 can be coupled to and accept data packets from a network (e.g., external network to the memory 100). The packet parser 101 can also be coupled to an input of the program counter 107 so that the packet parser 101 can load the program counter 107 with a program count (e.g., instruction memory location) that was received in a packet from the network. The packet parser 101 can also be coupled to an output of the program counter 107 so that the program counter 107 can load its present program count (e.g., instruction memory location) into the packet parser 101. The packet parser 101 can further be coupled to inputs of the instruction memory 105 and the register file 109 to enable loading of data (e.g., instructions) received in packets from the network into instruction memory 105 and the register file 109.

Figure 3:
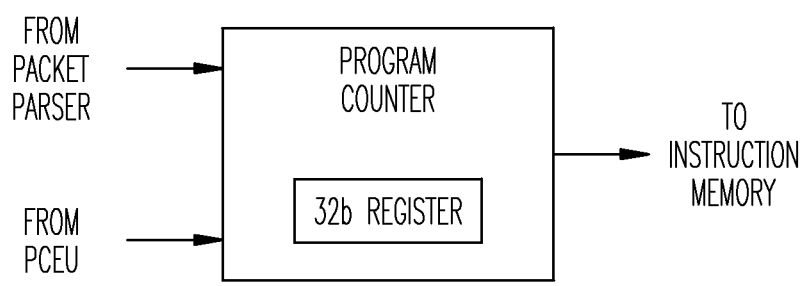
FIG. 3 illustrates a block diagram of an embodiment of a program counter in accordance with the embodiment of FIG. 1.

FIG. 3 illustrates a block diagram of the program counter 107. For purposes of illustration, the program counter 107 is shown as a 32 bit counter. However, other embodiments might use other program counter sizes.

The program counter 107 can have inputs from the packet parser 101 and a program counter execution unit (PCEU) 114 that can be part of the one or more execution units 113. The program counter 107 can have an output coupled to the instruction memory 105.

The program counter 107 can contain program count values (e.g., instruction memory locations) to access particular instruction locations in the instruction memory 105 that can contain a program (e.g., executable instructions). The program count values can be set from particular data fields in incoming packets, as determined by and received from the packet parser 101, or calculated values from the program counter execution unit 114. The program counter 107 can then output the value of the program count (e.g., 32-bit register) to the instruction memory 105.

Figure 4:
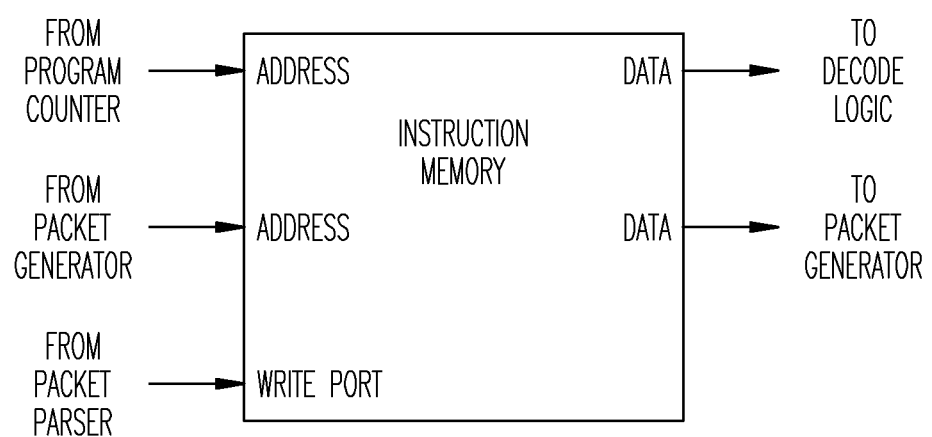
FIG. 4 illustrates a block diagram of an embodiment of an instruction memory in accordance with the embodiment of FIG. 1.

FIG. 4 illustrates a block diagram of the instruction memory 105. The instruction memory 105 can include a number of registers for storing a program (e.g., executable instructions). The packet parser 101 can be coupled to a write port of the instruction memory 105. The instruction memory 105 can be written to by the packet parser 101 such that instructions received within incoming packets, as determined by the packet parser 101, can be loaded from the packets into the instruction memory 105.

The instruction memory 105 can include two address ports that can each accept an address for accessing a particular location within the instruction memory 105. One address can come from the program counter 107. The other address can come from the packet generator 111.

During one operation, the instruction memory 105 can output an instruction (e.g., data port) from a location indicated by the address of the program counter 107. This instruction can be decoded and executed by the execution units 113 in order to instruct the execution units 113 as to an operation to perform. This instruction can give the execution units 113 operands as well as an index into the register file 109 to instruct the register file 109 as to what data to output to the execution units 113 for processing.

Figure 5:
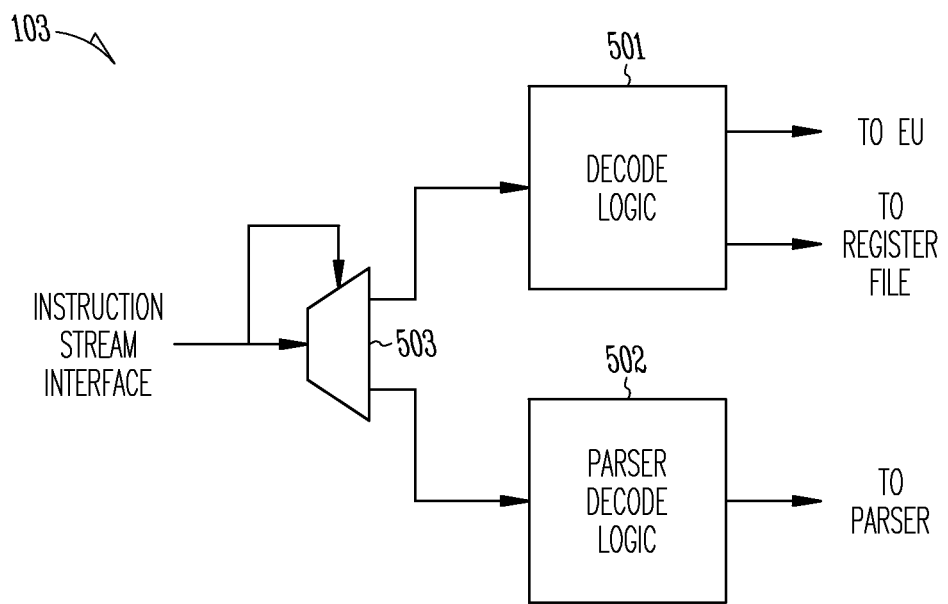
FIG. 5 illustrates a block diagram of an embodiment of decode logic in accordance with the embodiment of FIG. 1.

FIG. 5 illustrates a block diagram of the decode logic 103. The decode logic 103 can include execution unit decode logic 501, parser decode logic 502, and a demultiplexing function 503 (e.g., demultiplexer).

An input to the demultiplexing function 503 can be coupled to an instruction stream from the output of the instruction memory 105. One or more control bits in the instruction stream can be used to select the destination (e.g., EU decode logic 501, parser decode logic 502) of a particular instruction in the instruction stream.

If the instruction is sent to the EU decode logic 501, the EU decode logic 501 can process the instruction in order to send the instruction to one of the execution units 113. The instruction can instruct one of the execution units 113 as to what type of operation to perform as well as to give one of the execution units 113 an operand to be used during execution of the instruction. The operand can index into a register of the register file 109 and instruct that register as to what data to output so that one of the execution units 113 can process that data.

The demultiplexing function 503 can also send the instruction to the parser decode logic 502 that is coupled to the parser 115. The instruction can control the parser decode logic 502 that in turn instructs the parser which segments of the page buffer 117 to access in order to read data from a particular segment of the page buffer 117 into one of the execution units 113 for processing.

Figure 6:
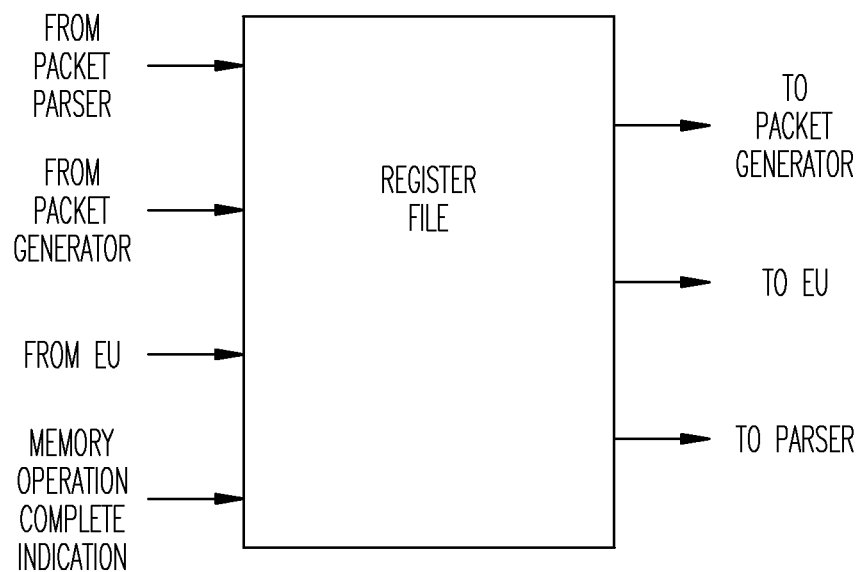
FIG. 6 illustrates a block diagram of an embodiment of a register file in accordance with the embodiment of FIG. 1.

FIG. 6 illustrates the block diagram of the register file 109. The register file 109 can include inputs from the packet parser 101, the packet generator 111, one or more of the execution units 113, and a memory read indication. The memory read indication can be a signal that is generated by the parser 115 indicating when a memory operation has been completed. The register file 109 can include outputs to the packet generator 111, the execution units 113, and the parser 115.

The register file 109 can include memory (e.g., plurality of registers) to store variables while processing by the execution units 113 is occurring. These variables can include data retrieved from the memory in response to one or more instructions. The register file 109 can be written to by the packet parser 101 in order to set initial conditions within the registers and can be read from by the packet generator 111. Each of the execution units 113 can receive arguments from the register file 109 through multiplexing functions. The output to the packet generator 111 can be used to bundle data stored in a register of the register file 109 into a packet for transmission to the network.

Figure 7A:
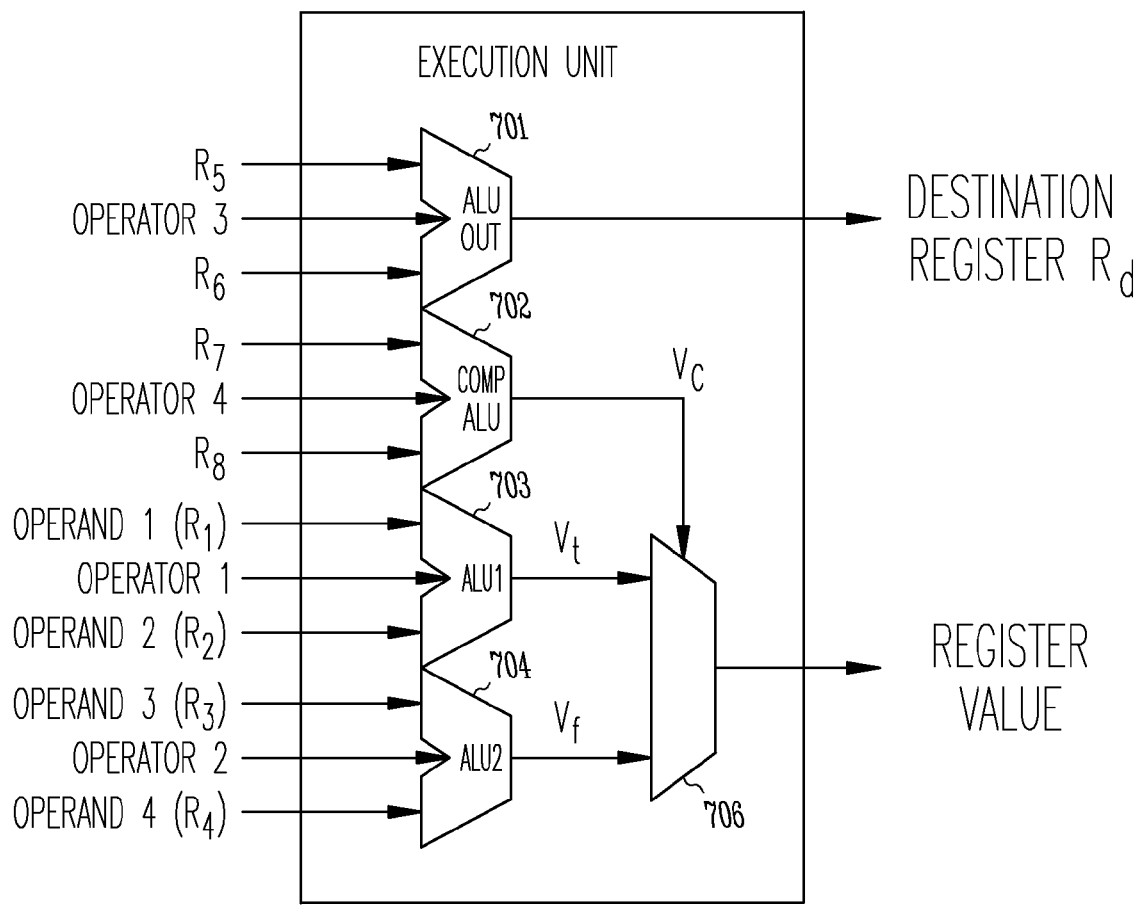
FIGS. 7A and 7B illustrate block diagrams of an embodiment of execution units in accordance with the embodiment of FIG. 1.
Figure 7B:
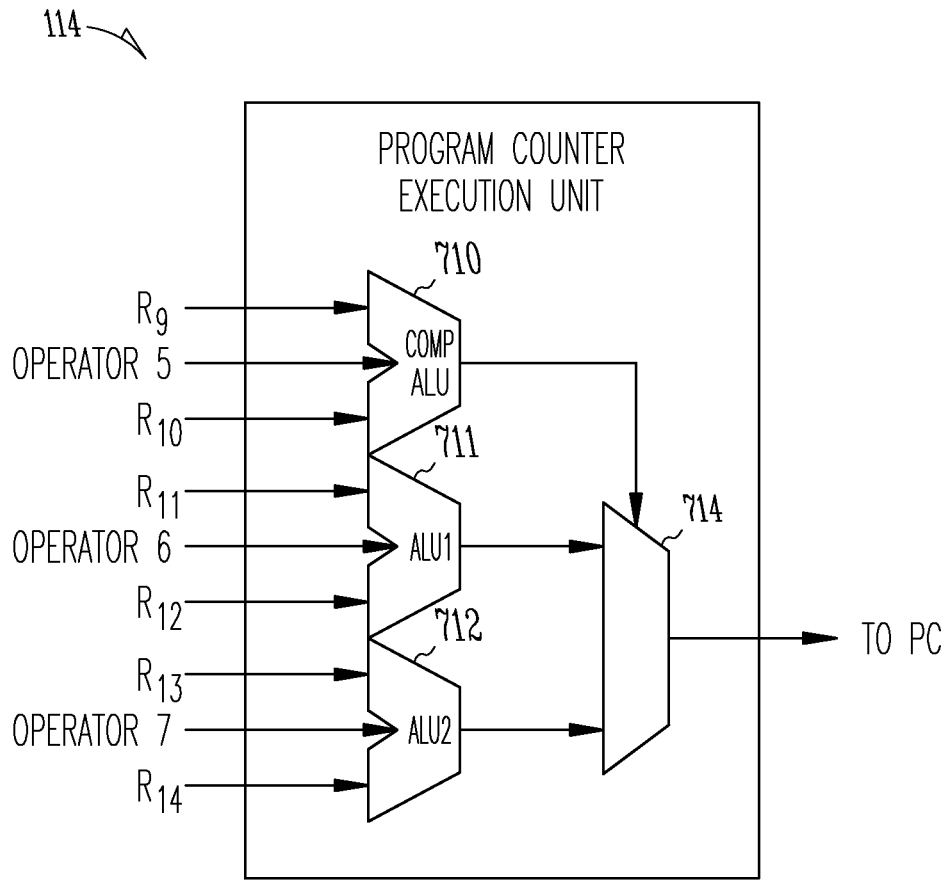

FIG. 7A illustrates a block diagram of an embodiment of the execution units 113 (e.g., execution units (0-N)) in general while FIG. 7B illustrates a block diagram of an embodiment of the program counter execution unit 114 in particular. The PCEU 114 can be considered to be part of the group of execution units 113 but can have a different architecture than other execution units 113.

There is no requirement for a specific number of execution units 113 that can be included in a particular autonomous memory processing apparatus. One apparatus might have a single execution unit 113 while another apparatus might have multiple (e.g., hundreds) of execution units.

FIG. 7A illustrates that the execution units 113 can include four arithmetic logic units (ALUs) 701-704. The outputs of ALU1 703 and ALU2 704 can be input to a multiplexing function 706. Which ALU 703, 704 output is selected can be determined by an output of Comp ALU 702 whose output can be used as the selection signal for the multiplexing function 706. The fourth ALU, ALU Out 701, can have an output as a register address $R_d$ to the register file 109 that can indicate to the register file 109 where to store the result of the operation performed by the execution units 113.

The lower three ALU's 702-704 and multiplexing function 706 can perform if-then-else operations. The multiplexing function 706 can provide the "if some condition" where the condition is determined by the Comp ALU 702. Thus, if a condition is true, then the output of one ALU (e.g., ALU1 703) is selected by the output of the Comp ALU 702, otherwise the output of the other ALU (e.g., ALU2 704) is selected by the output of the Comp ALU 702.

For example, if it is assumed that ALU1 703 has operand inputs OPERAND1 ($R_1$) and OPERAND2 ($R_2$) and command input OPERATOR1 and ALU2 704 has operand inputs OPERAND3 ($R_3$) and OPERAND4 ($R_4$) and command input OPERATOR2, the if-then-else statement can look like:

if (Condition)
then
Operand1 OPERATOR1 Operand2
else
Operand3 OPERATOR2 Operand4 where "Operand1 OPERATOR1 Operand2" can be provided by ALU1 703, "Operand3 OPERATOR2 Operand4" can be provided by ALU2 704, and "if (Condition)" can be provided by Comp ALU 702 and the multiplexing function 706.

As described subsequently with reference to the format of instructions of FIG. 10, the operands and operators can either be provided by instructions or the instructions can indicate which register the operand value is located. For example, OPERAND1 (R1) might be located in register $R_1$, OPERAND (R2) might be located in register $R_2$, OPERAND (R3) might be located in register $R_3$, OPERAND (R4) might be located in register $R_4$.

ALU1 703 and ALU2 704 can perform the same operation or different operations. In other words, OPERATOR1 and be the same as OPERATOR2 or OPERATOR1 can be different than OPERATOR2.

ALU Out 701 can have operand inputs $R_5$ and $R_6$ (e.g., registers $R_5$ and $R_6$) and command input OPERATOR3. The result, $R_d$, as generated by ALU Out 701 performing the command OPERATOR3 on values from $R_5$ and $R_6$ determines where the results of the execution unit 113 are stored.

Comp ALU 702 can have operand inputs $R_7$ and $R_8$ (e.g., registers $R_7$ and $R_8$) and command input OPERATOR4. As previously discussed, the result of performing command OPERATOR4 on values from $R_7$ and $R_8$ determines the selection of the multiplexing function 106.

Typical operations that can be used as commands (e.g., OPERATOR1, OPERATOR2, OPERATOR3, OPERATOR4) in the above ALU's 701-704 can include addition, subtraction, logical AND, logical OR, logical NOT, logical NOR, equal to, less than or equal to, less than, not equal to, greater than or equal to, or greater than. These operations are for purposes of illustration only as other embodiments can use other operations.

FIG. 7B illustrates the architecture of the program counter execution unit (PCEU) 114. This architecture can be similar to the execution units 0-n 113 but without the ALU Out 701. Since the PCEU 114 can be dedicated to determining a new address for the program counter 107, ALU Out 701 is not included since the location to store the results of the PCEU 114 operation will be the program counter 107.

The PCEU 114 can include Comp ALU 710 with operand inputs R9 and R10 and command input OPERATOR5. ALU1 711 can include operand inputs R11 and R12 and command input OPERATOR6. ALU2 712 can include operand inputs R13 and R14 and command input OPERATOR7.

The outputs of ALU1 711 and ALU2 712 can be input to the multiplexing function 714. The output of Comp ALU 710 can provide the selection signal for the multiplexing function 714. Thus, as in the previously described execution units 113, the PCEU 114 can provide an if-then-else statement where the multiplexing function 714 provides the "if some condition" where the condition is determined by the Comp ALU 710. Thus, if a condition is true, then the output of one ALU (e.g., ALU1 711) is selected by the output of the Comp ALU 710, otherwise the output of the other ALU (e.g., ALU2 712) is selected by the output of the Comp ALU 710. The result can be loaded into the program counter 107.

As in the previously described execution units 113, the operators and commands to be used in the PCEU 114 can be either loaded from an instruction from the instruction memory or the instruction can indicate which register can contain the value.

FIG. 8 illustrates the block diagram of the parser 115. The parser 115 can include a memory write port that includes the address to be written to as well as the data. A memory read address port can provide the address to the memory to read from such that the read data can be read into a memory read data port. The parser 115 can also output the memory read indication signal when the memory read operation has been completed. The parser 115 can further include an output to the execution units 113, an input from the register file 109, and a configuration input from the parser decode logic 502.

The parser 115 can have direct access to the memory 100 so that it can directly read from or write to the page buffer 117 of memory 100. The parser 115 has access to the entire length of the page buffer 117 so, to make processing more manageable, it can subdivide the page buffer 117 into smaller segments (e.g., regularly defined segments). For example, the parser 115 might operate on the first 100 bytes of the page buffer, then the next 100 bytes, and continue this until the entire page buffer 117 has been read/written. To accomplish this, the parser 115 can be given an address from the packet parser 101 that determines which segment of the page buffer 117 from which to read.

The parser 115 can receive a configuration input from the register file 109 that can instruct the parser 115 how to parse the contents of the page buffer 117. The parser 115 can generate the memory read indication signal that instructs the executing program that new content is available in the register file 109.

Figures 9, 10:
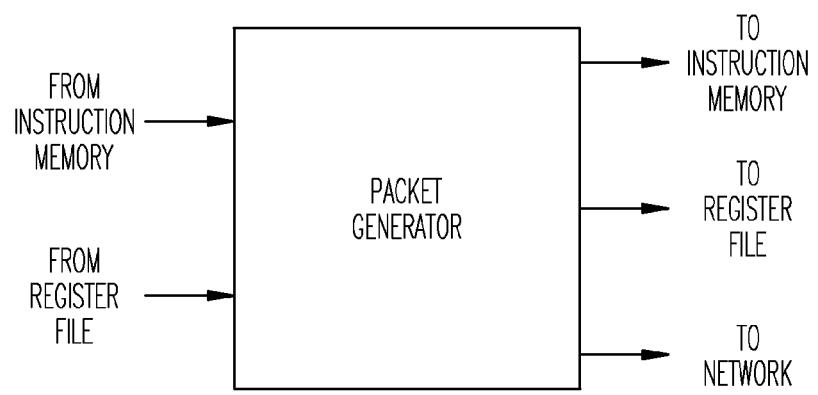
FIG. 9 illustrates a block diagram of an embodiment of a packet generator in accordance with the embodiment of FIG. 1.
FIG. 10 illustrates a diagram of an embodiment of a format for instruction execution in accordance with the embodiment of FIG. 1.

FIG. 9 illustrates the block diagram of an embodiment of the packet generator 111. The packet generator can include inputs from the instruction memory 105 and the register file 109 and outputs to the instruction memory 105 and the register file 109. The packet generator 111 additionally has an output to the network in order to output any generated packets.

The packet generator 111 can generate an address for the instruction memory 105 and an address for the register file 109 in order to read data from these elements 105, 109. The packet generator 111 can then use the read data (e.g., instructions from the instruction memory 105 and context (e.g., data, results from memory read, results from performed operations)) from the register file 109, bundle this data, and generate a packet to be transmitted over the network.

FIG. 10 illustrates an embodiment of a format of instruction execution in accordance with the embodiment of FIG. 1. Each instruction 1001-1003 can be stored in the instruction memory for execution by the execution units 113.

The illustrated embodiment of the instruction includes four instructions 1000-1003. Each instruction can be associated with a different ALU of the execution units 113. Thus, if the execution units 113 included a different quantity of ALU's, the execution format could include a different quantity of instructions 1000-1003. Reference is made to both FIG. 10 and the ALU's of FIG. 7A in the following discussion.

The first instruction 1000 (e.g., Instruction D) can represent the destination register (e.g., $R_d$) of a result of an operation by one of the execution units 113. As discussed previously, the ALU Out 701 can generate an address of the destination register $R_d$ in which to store the results of the execution unit 113. Thus, the ALU Out 701 can be associated with the first instruction 1000 for generating register $R_d$.

The second instruction 1001 (e.g., Instruction C) can represent the condition of the if-then-else statement represented by the execution unit 113. In the illustrated embodiment, the condition is represented by comparison value $V_C$. As discussed previously, the Comp ALU 702 can generate the condition used as the select signal for the multiplexing function 706. Thus, the Comp ALU702 can be associated with the second instruction 1001 for comparison of whether $V_C$ is true.

The third instruction 1002 (e.g., Instruction T) can represent the "then" result of the if-then-else statement represented by the execution unit 113. In the illustrated embodiment, the "then" result is represented by $V_t$—Value if true. As discussed previously, the ALU1 703 can generate the "then" result. Thus, the ALU1 703 can be associated with the third instruction 1002 for "then" result being $V_t$.

The fourth instruction 1003 (e.g., Instruction F) can represent the "else" result of the if-then-else statement represented by the execution unit 113. In the illustrated embodiment, the "else" result is represented by $V_f$—Value if false. As discussed previously, the ALU2 704 can generate the "else" result. Thus, the ALU2 704 can be associated with the fourth instruction 1003 for the "else" result of $V_f$.

Figure 11:
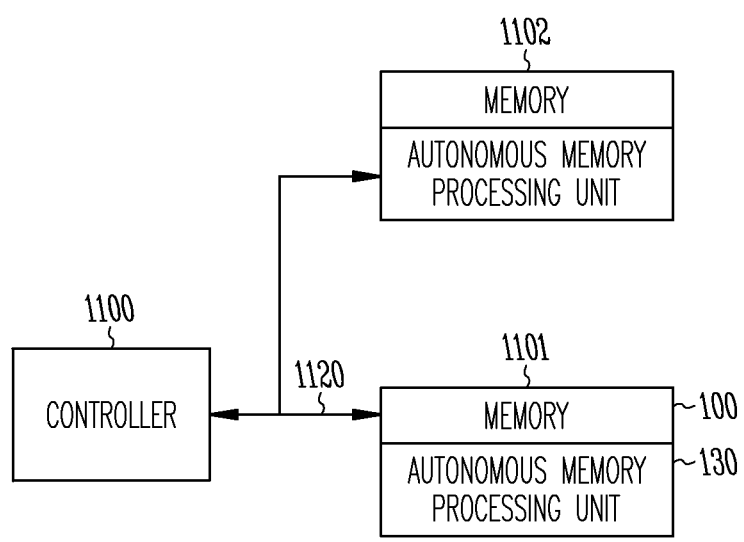
FIG. 11 illustrates a block diagram of an embodiment of a memory system.

Using the condition of $V_C$, the "then" result of $V_t$, the "else" result of $V_f$, and the result register of $R_d$, the if-then-else statement can be represented by:
if ($V_C$=TRUE)
then
Reg[$R_d$]:=$V_t$
else
Reg[$R_d$]:=$V_f$ FIG. 11 illustrates a block diagram of an embodiment of a memory system that can incorporate the autonomous memory processing apparatus 130 of FIG. 1. The memory system can include a controller 1100 (e.g., CPU) that can communicate over a network 1120 with one or more memory devices (e.g., SSD) 1101, 1102. The network 1120 might be a wired bus or wireless communications (e.g., WiFi).

The memory device 1101 can include local memory 100 (e.g., RAM, DRAM, SRAM, NAND Flash, NOR Flash, phase change memory (PCM)) that makes up the storage portion of the memory device 1101 as well as the autonomous memory processing apparatus 130 of FIG. 1. The autonomous memory processing apparatus 130 can be located relatively close to the memory 100 (e.g., same die, same die stack, same memory module). For example, the autonomous memory processing apparatus 130 might be included in circuitry at the bank level of the memory 100. Each bank might have a different autonomous memory processing apparatus 130 so that one memory chip might have multiple instances of the autonomous memory processing apparatus 130 operating substantially simultaneously. As used herein, local memory 100 can be memory that is connected to the autonomous memory processing apparatus 130 without going over the network.

Each of the devices of the system of FIG. 11 can be considered a node. Each node can communicate over the network 1120 with the other nodes. Each of the nodes might be substantially similar or one or more of the nodes can have a different architecture. For example, the first memory device 1101 might have only a single execution unit 113 in addition to the program counter execution unit 114 while the second memory device 1102 might have more than one execution unit 113 in addition to the program counter execution unit 114.

Thus, as subsequently described, the controller 1100 (e.g., source node) can send messages (e.g., packets) containing instructions and the current processing state of the source node to the memory device 1101 (e.g., target node). In another embodiment, the first memory device 1101 might be the source node while the second memory device 1102 might be the target node.

The instructions can include a command (e.g., search, sort, compare) to the memory device 1101. The memory device 1101 can perform the task instructed by the command without intervention by the controller. The autonomous memory processing apparatus 130 can send and receive messages to and from other nodes 1100, 1102, send and receive processing instructions and states to and from other nodes 1100, 1102, restore and save program states, execute processing instructions, read and write local memory, and/or support multiple processing contexts in a single node.

The autonomous memory processing apparatus 130 architecture can provide dynamic, seamless flexibility of adding and removing execution units 113 (e.g., comprising ALUs), thus giving nodes additional processing power as needed.

The dynamic adding and removal of execution units 113 in an autonomous memory processing apparatus 130 can be illustrated in the following example of operation.

A typical prior art program can be generated as follows:
Instruction1 (ADD Register1, Register2, Register3)
Instruction2 (SUB Register2, Register3, Register4)

As in a typical prior art CPU system, there are implied dependencies in these instructions. For example, Instruction2 may not be able to execute before (or in the same cycle as) Instruction1 because the value in Register2 would be overwritten before Instruction1 has had a chance to execute.

In the autonomous memory processing apparatus architecture, a more complex execution unit (EU) architecture can be used in order to reduce the number of cycles required to execute a program. Each EU can contain a number of different ALUs (e.g., four ALUs) that each perform distinct tasks. Thus, programs written for the autonomous memory processing apparatus can be generated as the following (assuming an architecture with one EU plus the PCEU):
[PCEU Instruction1] [EU1 Instruction1]
[PCEU Instruction2] [EU1 Instruction2]

Each [EU# Instruction#] can appear as the following, as illustrated in FIG. 10:
[Destination Instruction] [Comparison Instruction] [If-true Instruction] [If-false Instruction]

Also, as part of the autonomous memory processing apparatus architecture, processors can have a different number of EUs embedded within them. This can enable an architecture that has four EUs and one PCEU, for instance:
[PCEU Instruction1] [EU1 Instruction1] [EU2 Instruction1] [EU3 Instruction1] [EU4 Instruction1]
[PCEU Instruction2] [EU1 Instruction2] [EU2 Instruction2] [EU3 Instruction2] [EU4 Instruction2

Either one of these EU's instructions may be empty due to the fact that there may not be additional work to perform in this cycle. This may be due to the lack of parallelism in a particular stage of a program.

The autonomous memory processing apparatus architecture can enable interaction between a heterogeneous set of autonomous memory processing apparatus engines in a system (e.g. one apparatus, "A", may have one EU plus the PCEU, while another apparatus, "B", in the same interconnected system, may have 4 EUs plus the PCEU). If it is assumed that, in this scenario, apparatus A needs to send its context to apparatus "B", the program can be packaged into a sequential stream of instructions and shipped to apparatus "B". Apparatus "B" can then schedule them in the same way on its hardware as follows:
[PCEU Instruction1] [EU1 Instruction1] [EMPTY] [EMPTY] [EMPTY]
[PCEU Instruction2] [EU1 Instruction2] [EMPTY] [EMPTY] [EMPTY]
. . .

This can lead to lost parallelism resulting in inefficiencies in a system since every program would eventually approach that of the narrowest autonomous memory processing apparatus.

The instructions may not be bundled into the parallel EUs without ensuring that there are not any dependencies between the instructions. Since this kind of comparison could be computationally expensive in a typical prior art system, the autonomous memory processing apparatus can use the concept of an instruction "fence" flag. The "fence" flag enables an application writer or compiler to mark where an instruction stream no longer has any dependencies on the previous instructions in that stream. This information can enable an instruction stream to be passed around and scheduled on a heterogeneous set of processors without significant processing overhead.

For example, the following instruction stream: [PCEU Instruction] [EU Instruction1] [EU Instruction2] [EU Instruction3] [Fence Marker/Instruction] [EU Instruction4] [EU Instruction5] [EU Instruction6] [EU Instruction7] [Fence Flag/Instruction], could be scheduled in the following way on the autonomous memory processing apparatus "A" (where [F] indicates a "fence" marker): [PCEU] [1] [PCEU] [2] [F] [PCEU] [3] [PCEU] [4] [PCEU] [5] [PCEU] [6] [F] [PCEU] [7], and could be scheduled in the autonomous memory processing apparatus "B" as: [PCEU] [1] [2] [3] [X] [F] [PCEU] [4] [5] [6] [7].

The "fence" instruction can be processed by packet-in logic while it is being loaded into the instruction memory of the given autonomous memory processing apparatus (e.g., "A" or "B"). The presence of a "fence" flag can be stored in the instruction memory, but may be meaningless outside the context of scheduling. However, it is stored as a flag in the instruction memory so that packet-out logic can reconstruct the original stream.

As an example of operation of the autonomous memory processing apparatus (e.g., memory search), a packet can be received by the packet parser 101 from a network (e.g., memory network). The packet parser 101 can parse the packet into segments. Some segments can be context in that they may contain register contents that represent a state a previous node was in when the packet left the previous node.

The packet may contain a starting location in the instruction memory 105 for the program to be executed. This starting point can be loaded into the program counter 107. The packet can also contain a set of instructions to be loaded into the instruction memory 105 and a set of initial conditions that can be loaded into the register file 109. The initial conditions can be variables being sent by instructions from a previous node. The initial conditions can also be constants for use by the currently executing program.

The value in the program counter 107 determines which instruction is read from the instruction memory 105 to be executed. The next value in the program counter 107 might be an increment from the previous value or a calculated value as determined by the program counter execution unit 114.

The instructions can set the configuration of the parser 115. The parser 115 can be configured, through execution of the instructions, to remove variables from the page buffer 117 and eventually to perform a memory read operation.

When the memory read operation occurs, the variables can be removed out of the page buffer 117 content in real-time and presented to the execution units 113 as inputs. Other potential inputs can be read from the register file, as determined by program instructions, and can be presented to the execution units 113 for processing. As described previously, the "fence" can provide the ability to execute several consecutive instructions in parallel. The instructions that cannot be executed in parallel can be held off and executed during a subsequent cycle.

The execution units 113 can process those input arguments as a plurality of sets of input arguments, each set being processed in parallel. Thus, multiple execution units 113 can generate output variables that can then either get transferred back to the register file, transferred to the parser 115 to eventually be written to the page buffer 117 as data for one or more memory write operations, or the output variables could go into the register file to generate some particular action. The action might be to generate a packet by the packet generator 111 or to initiate a new memory read or memory write operation.

The page buffer 117 content (e.g., result of a search command) might be presented to the packet generator 111 to be included in a packet to be transmitted over the network to a requesting node. The packet might include a message to the requesting node indicating that the task (e.g., search) has been completed and the results are included in the packet.

As a broader example of operation, a network might include a fabric of autonomous memory devices, each including at least one autonomous memory processing apparatus. A group of data can be stored across the fabric of memory devices. When it is desired to search the entire group of data for a particular list of data, a search program can be pushed into one autonomous memory device to search that device for the particular list of data. When the program determines that the data stored within that particular autonomous memory device has been searched and all of the data from the list is not present, the program can be bundled into one or more packets and transferred to another autonomous memory device where the autonomous memory processing apparatus of that device can continue the search. This bundling of the program can continue until the entire fabric of autonomous memory devices has been searched or the list of data has been completed. In some embodiment, the data found in a particular autonomous memory device can also be bundled into the packet(s) with the program to be transferred.

Figure 12:
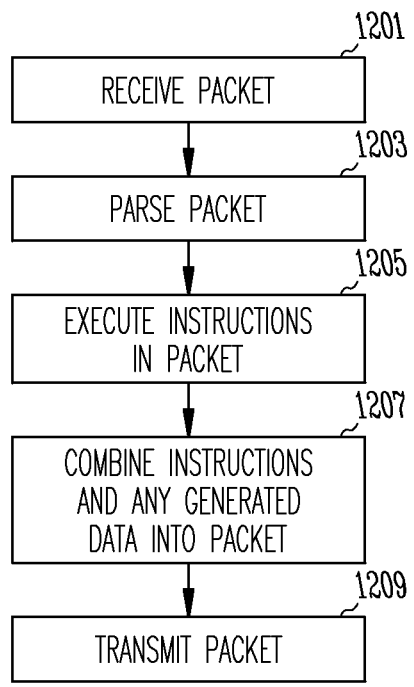
FIG. 12 illustrates a flowchart of an embodiment of operation of the autonomous memory processing apparatus in an autonomous memory device.

Such an embodiment is illustrated in the flowchart of FIG. 12. The illustrated method can be executed in the system of FIG. 11 by the autonomous memory processing apparatus 130 in the autonomous memory device 1101.

The memory device 1101 can receive a packet 1201 that is provided to the autonomous memory processing apparatus 130. The apparatus 130 can parse the packet 1203 to remove the instructions, program counter, and data as discussed previously. The instructions can then be executed 1205 to perform the desired task on the data stored in the memory 100. The instructions, and any data generated by the instructions, can then be bundled into a packet 1207 for transmission on the network 1209.

An apparatus may be defined as circuitry, an integrated circuit die, a memory device, a memory array, or a system.

CONCLUSION

One or more embodiments of the autonomous memory processing apparatus within an autonomous memory device can perform processing of instructions to relieve memory bandwidth bottlenecks of traditional CPU-based computing systems. Packets containing a set of instructions (e.g., the program) and/or data can be transferred amongst nodes so that the data in the memory in those nodes can be operated on by the instructions independent of control from the source node or the CPU.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

What is claimed is:

1. A method comprising:
   receiving a set of instructions at an autonomous memory device;

executing the set of instructions in the memory device;
combining, into a packet, the set of instructions with any data recovered from the memory device in response to the set of instructions; and
transmitting the packet from the memory device.

2. The method of claim 1 wherein receiving the set of instructions at the memory device and transmitting the packet from the memory device respectively comprise receiving the set of instructions from a network coupled to the memory device and transmitting the packet to the network.

3. The method of claim 1 wherein receiving the set of instructions comprises receiving a packet comprising the set of instructions.

4. The method of claim 3 further comprising parsing the received packet.

5. The method of claim 4 wherein parsing the received packet comprises:
loading a program counter with an initial program counter value associated with the received set of instructions;
loading an instruction memory with the set of instructions; and
loading a register file with a set of initial conditions associated with the set of instructions.

6. The method of claim 5 wherein executing the set of instructions comprises:
calculating a new program counter value after executing a first instruction of the set of instructions; and
storing the new program counter value in the program counter.

7. The method of claim 5 wherein executing the set of instructions comprises incrementing the initial program counter value after executing a first instruction of the set of instructions.

8. The method of claim 1 wherein executing the set of instructions comprises executing a first instruction in a first execution unit and a second instruction in a second execution unit wherein the execution of the first and second instructions is substantially in parallel.

9. A method comprising:
receiving, from a first node of a plurality of nodes, a packet comprising a set of instructions, a starting location, and a set of initial conditions for the set of instructions;
parsing the packet to locate the set of instructions, the starting location, and the set of initial conditions;
storing the set of instructions in an instruction memory, the starting location in a program counter, and the initial conditions in a register file;
executing the set of instructions from the starting location, wherein data is read from memory in response to at least one instruction of the set of instructions;
combining the set of instructions and the data read from memory into a packet; and
transmitting the packet to a second node of the plurality of nodes.

10. The method of claim 9 wherein the initial conditions are data received from a third node of the plurality of nodes.

11. The method of claim 9 wherein the set of instructions comprise a fence flag and storing the set of instructions comprises:
storing one or more instructions prior to the fence flag in the instruction memory and one or more instructions succeeding the fence flag in the instruction memory.

12. The method of claim 11 and further comprising:
executing the one or more instructions prior to the fence flag during a first cycle; and
executing the one or more instructions after the fence flag during a second cycle.

13. The method of claim 12 wherein executing the one or more instructions prior to the fence flag is performed substantially simultaneously with executing the one or more instructions after the fence flag.

14. The method of claim 9 wherein executing the set of instructions comprises:
generating variables;
storing the variables in the register file; and
combining the variables into the packet for transmission.

15. The method of claim 9 wherein executing the set of instructions comprises:
providing a plurality of operands to a program counter execution unit;
providing an operator to the program counter execution unit; and
generating an updated program counter value in response to results from the execution of the operator on the plurality of operands.

16. An apparatus comprising:
a packet parser configured to receive a packet comprising instructions and a starting location;
instruction memory coupled to the packet parser and configured to receive the instructions;
a program counter coupled to the instruction memory and the packet parser, the program counter configured to initially receive the starting location from the packet parser and retrieve an instruction from the instruction memory at the starting location;
a plurality of execution units coupled to the instruction memory for executing the instructions;
a parser coupled to the plurality of execution units, the parser configured to control reading of data from a local memory;
a register file coupled to the parser and the instruction memory and configured to ore the data from the packet parser; and
a packet generator coupled to the instruction memory and the register file, the packet generator configured to generate a packet for transmission, that comprises the set of instructions and the data.

17. The apparatus of claim 16 and further comprising parser decode logic that couples the plurality of execution units to the parser.

18. The apparatus of claim 16 wherein each of the plurality of execution units comprise:
a plurality of arithmetic logic units (ALUs); and
a multiplexing function coupled between outputs of at least two of the plurality of the arithmetic logic units.

19. The apparatus of claim 18 wherein the plurality of ALUs of a first execution unit comprises an ALU associated with each instruction from the instructions.

20. The apparatus of claim 18 wherein each of the plurality of execution units implements an if-then-else statement.

21. The apparatus of claim 18 wherein in a first execution unit, a first ALU of the plurality of ALUs, in combination with the multiplexing function, is configured to generate an "if (condition)" statement, a second ALU of the plurality of ALUs is configured to generate a "then result" statement, a third ALU of the plurality of ALUs is configured to generate an "else result" statement, and a fourth ALU of the plurality of ALUs is configured to generate an address for storing a result from an output of the multiplexing function.

22. The apparatus of claim 21 wherein the plurality of execution units further comprises a program counter execution unit, coupled to the program counter, that does not comprise an ALU configured to generate an address for storing the result from the output of the multiplexing function.

23. The apparatus of claim 16 wherein the local memory comprises one of: NAND Flash, NOR Flash, DRAM, SRAM, SSD or phase change memory.

24. A system comprising:
a plurality of nodes coupled together over a network, each node of the plurality of nodes comprising:
a local memory; and
an autonomous memory processing apparatus coupled to the local memory and comprising circuitry configured to receive a packet, parse the packet to remove a set of instructions, execute the instructions to read data from the local memory, combine the set of instructions and the data into a packet, and transmit the packet to another node of the plurality of nodes.

25. The system of claim 24 wherein the circuitry is further configured to parse the packet to remove a program counter initial value.

26. The system of claim 25 wherein the circuitry is further configured to calculate an updated program counter value.

27. The system of claim 24 wherein the circuitry comprises a page buffer coupled to the local memory, the page buffer coupled to and controlled by a parser that is configured to read segments of the page buffer in response to the set of instructions.

28. The system of claim 24 wherein the circuitry is further configured to transfer packets containing a program and data amongst the plurality of nodes such that data in the local memory of the plurality of nodes can be operated on by the program and the packets can be updated with data from the local memory of the plurality of nodes.

29. The system of claim 28 wherein the circuitry is further configured to transmit an updated packet to a central processing unit controlling the system when the program has been completed.

* * * * *